(12) United States Patent
Saito et al.

(10) Patent No.: US 6,496,653 B2
(45) Date of Patent: Dec. 17, 2002

(54) CAMERA OPERATING APPARATUS

(75) Inventors: Toshikazu Saito, Yokohama (JP); Kazuya Suzuki, Fujisawa (JP); Daijiro Kawai, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/916,025

(22) Filed: Jul. 26, 2001

(65) Prior Publication Data

US 2002/0031346 A1 Mar. 14, 2002

(30) Foreign Application Priority Data

Jul. 26, 2000 (JP) .......................................... 2000-225384

(51) Int. Cl.[7] .............................................. G03B 17/00
(52) U.S. Cl. ...................... 396/300; 396/427; 348/143; 348/159
(58) Field of Search ................................ 396/300, 419, 396/427; 348/143, 148, 149, 150, 152, 153, 156, 157, 159

(56) References Cited

U.S. PATENT DOCUMENTS 5,430,511 A * 7/1995 Paff et al. ..................... 341/22
5,517,236 A * 5/1996 Sergeant et al. ............. 348/143

* cited by examiner

Primary Examiner—David M. Gray
(74) Attorney, Agent, or Firm—Pearne & Gordon LLP

(57) ABSTRACT

A camera operating apparatus for operating at least one camera unit at an operation speed which is to be changed by an operator, comprises a retainer having an operation surface, a joystick mounted on the retainer and having a center axis, the joystick being pivotable at an inclination angle between the center axes of the joystick positioned at first and second angular positions, angle signal inputting means for inputting an angle signal indicative of the inclination angle of the joystick, a plurality of keys each operatively arranged on the retainer to perform a key-pushed action and a key-released action, each of the keys being operative to input a speed signal indicative of the key-pushed action thereof, the keys including a specified key selected for the operation speed of the camera unit desired by the operator, information recording means for recording specific relevant information between the angle signal inputted from the angle signal inputting means and the speed signal inputted from the specified key, and signal processing means for processing the speed signal in response to the angle signal from the angle signal inputting means to be outputted to the camera unit in accordance with the specific relevant information recorded by the information recording means.

13 Claims, 8 Drawing Sheets

FIG.4

| INCLINATION ANGLE | OPERATION SPEED |
|---|---|
| A | 0 |
| B | 1 |
| C | 2 |
| D | 3 |
| E | 4 |
| F | 5 |
| G | 6 |
| H | 7 |
| I | 8 |

FIG.6

| INCLINATION ANGLE | OPERATION SPEED |
|---|---|
| A | 0 |
| B | 8 |
| C | 8 |
| D | 8 |
| E | 0 |
| F | 0 |
| G | 4 |
| H | 4 |
| I | 4 |

FIG.8
PRIOR ART
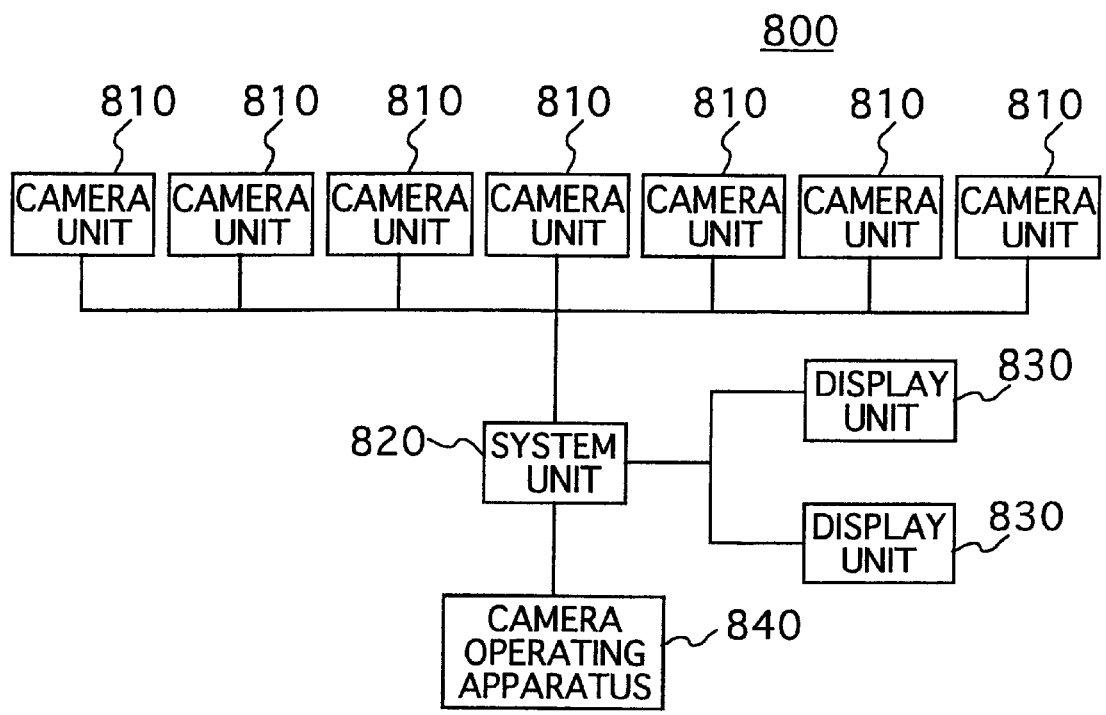
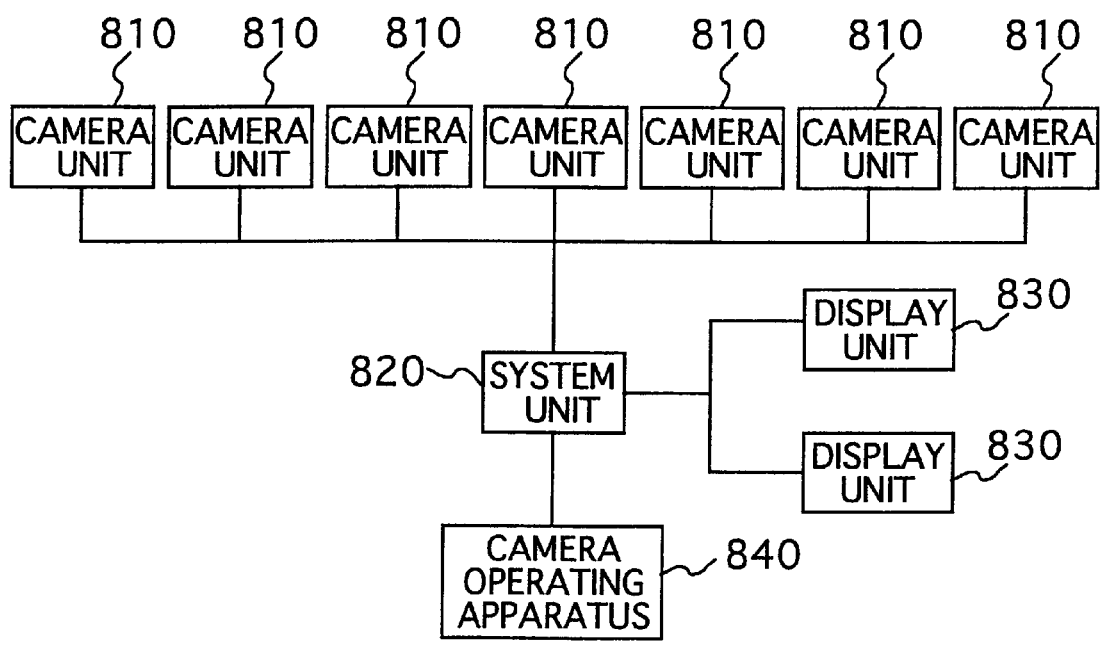

CAMERA OPERATING APPARATUS

BACKGROUND OF THE INVENTION

1. Field of the Invention

The present invention relates to a camera operating apparatus available for a surveillance system, and more particularly to a camera operating apparatus equipped with a joystick to operate at least one camera unit.

2. Description of the Related Art

Up until now, there have been proposed a wide variety of conventional camera operating apparatuses each equipped with a joystick to operate at least one camera unit at an operation speed and at an operation direction which are to be changed by an operator.

The conventional camera operating apparatuses of this type have so far been used for such a surveillance system available for watching unqualified people and other intruders intruding into a special room which does not permit people with any permission from entering. One typical example of the conventional camera operating apparatuses is shown in FIG. 7 as being provided in combination with a prior-art surveillance system 700 which comprises a camera unit 710, a system unit 720 for controlling an operation speed and an operation direction of the camera unit 710, a display unit 730 for displaying an image taken by the camera unit 710 on a screen thereof, and the camera operating apparatus 740 for operating the camera unit 710 at the operation speed and at the operation direction which are to be changed by the operator in response to operation commands inputted therein. The system unit 720 is electrically connected to the camera unit 710, the display unit 730 and the camera operating apparatus 740 through signal transmitting lines 701, 702 and 703, respectively.

Description will now be made on how the image taken by the camera unit 710 is displayed on the screen of the display unit 730.

When the camera unit 710 is operated to take an image to be displayed on the screen of the display unit 730, the camera unit 710 is firstly driven by the camera operating apparatus 740 to transform the image into an image signal outputted to the signal transmitting line 701. The image signal thus outputted to the signal transmitting line 701 is then transmitted to the system unit 720 before being inputted to the display unit 730.

The image signal is then transformed into an image to be displayed on the screen of the display unit 730.

In order to have the camera unit 710 operated by the operation commands of the camera operating apparatus 740 to photograph an image, the camera operating apparatus 740 is operated to receive the operation commands respectively indicative of photographing directions, magnifications and the like inputted by the operator while he or she is watching the screen of the display unit 730. The camera operating apparatus 740 inputted with the operation commands is then operated to transform the operation commands into a command signal to be transmitted to the signal transmitting line 703. The command signal thus transmitted to the signal transmitting line 703 is then inputted to the system unit 720 where the command signal is then transformed into a drive signal to drive the camera unit 710 to be outputted to the camera unit 710 by way of the signal transmitting line 701. The camera unit 710 thus received the drive signal from the system unit 720 is at this time operated to change the photographing directions, magnifications and the like into new ones.

As will be seen from the above, there has been described only one camera unit 710 provided in combination with the system unit 720, the display unit 730 and the camera operating apparatus 740 in the conventional surveillance system 700 for the purpose of simplifying the description and assisting in understanding about the whole operation of the surveillance system 700.

In reality, such a conventional surveillance system 800, however, is as shown in FIG. 8 to comprise a plurality of camera units 810, a plurality of system units 820, a plurality of display units 830, and a plurality of camera operating apparatuses 840. The conventional surveillance system 800 thus constructed allows the operator to selectively operate those camera operating apparatuses 840 to input to camera operating apparatuses 840 operation commands indicative of selecting one or more camera units 810 and one or more display units 830. This fact leads to the fact that the operator can select one or more camera operating apparatuses 840 not only to have the image displayed on the screen of one or more display units 830 in accordance with the image taken by one or more selected camera units 810 but to operate the camera units 810 under various operation states optioned by the operator.

Here, as the camera operating apparatus 840 forming part of the conventional surveillance system 800 is used a CCTV (Closed Circuit Television) type of camera operating apparatus which is hereinafter referred simply to "camera operating apparatus". The camera operating apparatus used heretofore is generally equipped with a joystick designed to input operation commands by the operator to ensure that the camera unit is operated under various operation states changed in photographing directions, magnifications and the like. The joystick is generally mounted on a retainer and pivotable at a variable inclination angle between the axis of the joystick and the surface of the retainer.

The joystick thus constructed serves to produce the operation command indicative of the inclination angle varied in response to the operation speed of the camera unit. More specifically, the operation speed of the camera unit increases as the inclination angle of the joystick increases in accordance with the relation between the inclination angle of the joystick and the operation speed of the camera unit.

The conventional camera operating apparatus, however, encounters such a problem that the relation between the inclination angle of the joystick and the operation speed of the camera unit is fixedly predetermined by each of the camera operating apparatuses, resulting from the fact that the relation between the inclination angle of the joystick and the operation speed of the camera unit cannot be changed depending upon the needs by the operator.

SUMMARY OF THE INVENTION

It is, therefore, an object of the present invention to provide a camera operating apparatus which facilitates to change the relation between the inclination angle of the joystick and the operation speed of the camera unit depending upon the needs by the operator to allow the operator to readily operate the joystick.

In accordance with a first aspect of the present invention, there is provided a camera operating apparatus for operating at least one camera unit at an operation speed which is to be changed by an operator, comprising: a retainer having an operation surface; a joystick mounted on the retainer and having a center axis and a center point located on the center axis, the joystick being pivotable around the center point of the joystick to assume a first angular position where the joystick is inclined with respect to the operation surface of the retainer, and a second angular position where the joystick is inclined with respect to the operation surface of the retainer at an inclination angle between the center axes of the joystick positioned at the first and second angular positions, the inclination angle being variably set with respect to the operation speed; angle signal inputting means for inputting an angle signal indicative of the inclination angle of the joystick; a plurality of keys each operatively arranged on the retainer to perform a key-pushed action and a key-released action, each of the keys being operative to input a speed signal indicative of the key-pushed action thereof, the keys including a specified key selected for the operation speed of the camera unit desired by the operator, information recording means for recording specific relevant information between the angle signal inputted from the angle signal inputting means and the speed signal inputted from the specified key; and signal processing means for processing the speed signal in response to the angle signal from the angle signal inputting means to be outputted to the camera unit in accordance with the specific relevant information recorded by the information recording means.

The information recording means may be operative to record the specific relevant information when the signal processing means is operative to receive the angle signal from the angle signal inputting means and the speed signal from the specified key.

The keys may include a plurality of numerical keys which are selectively operated to input the speed signal to the signal processing means.

In accordance with a second aspect of the present invention, there is provided a camera operating apparatus for operating at least one camera unit at an operation speed which is to be changed by an operator, comprising: a retainer having an operation surface; a joystick mounted on the retainer and having a center axis and a center point located on the center axis, the joystick being pivotable around the center point of the joystick to assume a first angular position where the joystick is inclined with respect to the operation surface of the retainer, and a second angular position where the joystick is inclined with respect to the operation surface of the retainer at an inclination angle between the center axes of the joystick positioned at the first and second angular positions, the inclination angle being variably set with respect to the operation speed; angle signal inputting means for inputting an angle signal indicative of the inclination angle of the joystick; a plurality of keys each operatively arranged on the retainer to perform a key-pushed action and a key-released action, each of the keys being operative to input a speed signal indicative of the key-pushed action thereof, the keys including a specified key selected for the operation speed of the camera unit desired by the operator, information recording means for recording specific relevant information between the angle signal inputted from the angle signal inputting means and the speed signal inputted from the specified key; and signal processing means for receiving and processing the angle signal inputted from the angle signal inputting means and the speed signal inputted from the specified key, the signal processing means being operative to selectively assume two different operation states consisting of a first operation state under which the specific relevant information is recorded by the information recording means in accordance with the angle signal inputted by the angle signal inputting means and the speed signal inputted by the specified key, and a second operation state under which the speed signal in response to the angle signal inputted by the angle signal inputting means is outputted to the camera unit in accordance with the specific relevant information recorded by the information recording means.

The camera operating apparatus may further comprise state setting means for selectively setting the first and second operation states of the signal processing means.

The state setting means may include a first operation state holding key operatively arranged on the retainer to perform a key-pushed action and a key-released action, the first operation state holding key being operative to input a first operation state holding signal indicative of the key-pushed action thereof to the signal processing means to allow the signal processing means to assume the first operation state.

The state setting means may include a second operation state holding key operatively arranged on the retainer to perform a key-pushed action and a key-released action, the second operation state holding key being operative to input a second operation state holding signal indicative of the key-pushed action thereof to the signal processing means to allow the signal processing means to assume the second operation state.

The keys may include a plurality of numerical keys which are selectively operated to input the speed signal to the signal processing means.

In accordance with a third aspect of the present invention, there is provided a camera operating apparatus for operating at least one camera unit at an operation speed which is to be changed by an operator, comprising: a retainer having an operation surface; a joystick mounted on the retainer and having a center axis and a center point located on the center axis, the joystick being pivotable around the center point of the joystick to assume a first angular position where the joystick is inclined with respect to the operation surface of the retainer, and a second angular position where the joystick is inclined with respect to the operation surface of the retainer at an inclination angle between the center axes of the joystick positioned at the first and second angular positions, the inclination angle being variably set with respect to the operation speed; angle signal inputting means for inputting an angle signal indicative of the inclination angle of the joystick, the angle signal inputting means having a terminal having the angle signal outputted therethrough; a plurality of keys each operatively arranged on the retainer to perform a key-pushed action and a key-released action, each of the keys being operative to input a speed signal indicative of the key-pushed action thereof, the keys including a specified key selected for the operation speed of the camera unit desired by the operator, the keys having a terminal having the respective speed signals outputted therethrough; information recording means for recording specific relevant information between the angle signal inputted from the angle signal inputting means and the speed signal inputted from the specified key, the information recording means having a terminal having the angle signal and the speed signal inputted and outputted therethrough; and signal processing means for receiving and processing the angle signal inputted from the angle signal inputting means and the speed signal inputted from the specified key, the signal processing means being operative to selectively assume two different operation states consisting of a first operation state under which the specific relevant information is recorded by the information recording means in accordance with the angle signal inputted by the angle signal inputting means and the speed signal inputted by the specified key, and a second operation state under which the speed signal in response to the angle signal inputted by the angle signal inputting means is outputted to the camera unit in accordance with the specific relevant information recorded by the information recording means, the signal processing means having a first terminal having the angle signal inputted therethrough, a second terminal having the speed signal inputted therethrough, a third terminal having the angle signal and the speed signal inputted and outputted therethrough and a fourth terminal having the speed signal outputted therethrough.

The camera operating apparatus may further comprise state setting means for selectively setting the first and second operation states of the signal processing means.

The state setting means may include a first operation state holding key operatively arranged on the retainer to perform a key-pushed action and a key-released action, the first operation state holding key being operative to input a first operation state holding signal indicative of the key-pushed action thereof to the signal processing means to allow the signal processing means to assume the first operation state, the first operation state holding key having a terminal having the first operation state holding signal outputted therethrough.

The state setting means may include a second operation state holding key operatively arranged on the retainer to perform a key-pushed action and a key-released action, the second operation state holding key being operative to input a second operation state holding signal indicative of the key-pushed action thereof to the signal processing means to allow the signal processing means to assume the second operation state, the second operation state holding key having a terminal having the second operation state holding signal outputted therethrough.

The keys may include a plurality of numerical keys which are selectively operated to input the speed signal to the signal processing means.

BRIEF DESCRIPTION OF THE DRAWINGS

The objects, features and advantages of the present invention will become apparent as the description proceeds when taken in conjunction with the accompanying drawings, in which:

FIG. 4 is a table showing one relation between an inclination angle of a joystick forming part of the camera operating apparatus shown in FIG. 3 and an operation speed of a camera unit;

FIG. 6 is a table similar to FIG. 4 but showing another relation between an inclination angle of a joystick forming part of the camera operating apparatus shown in FIG. 3 and an operation speed of a camera unit;

FIG. 8 is a block diagram of another example of the conventional surveillance system.

DESCRIPTION OF THE PREFERRED EMBODIMENTS

Figure 1:
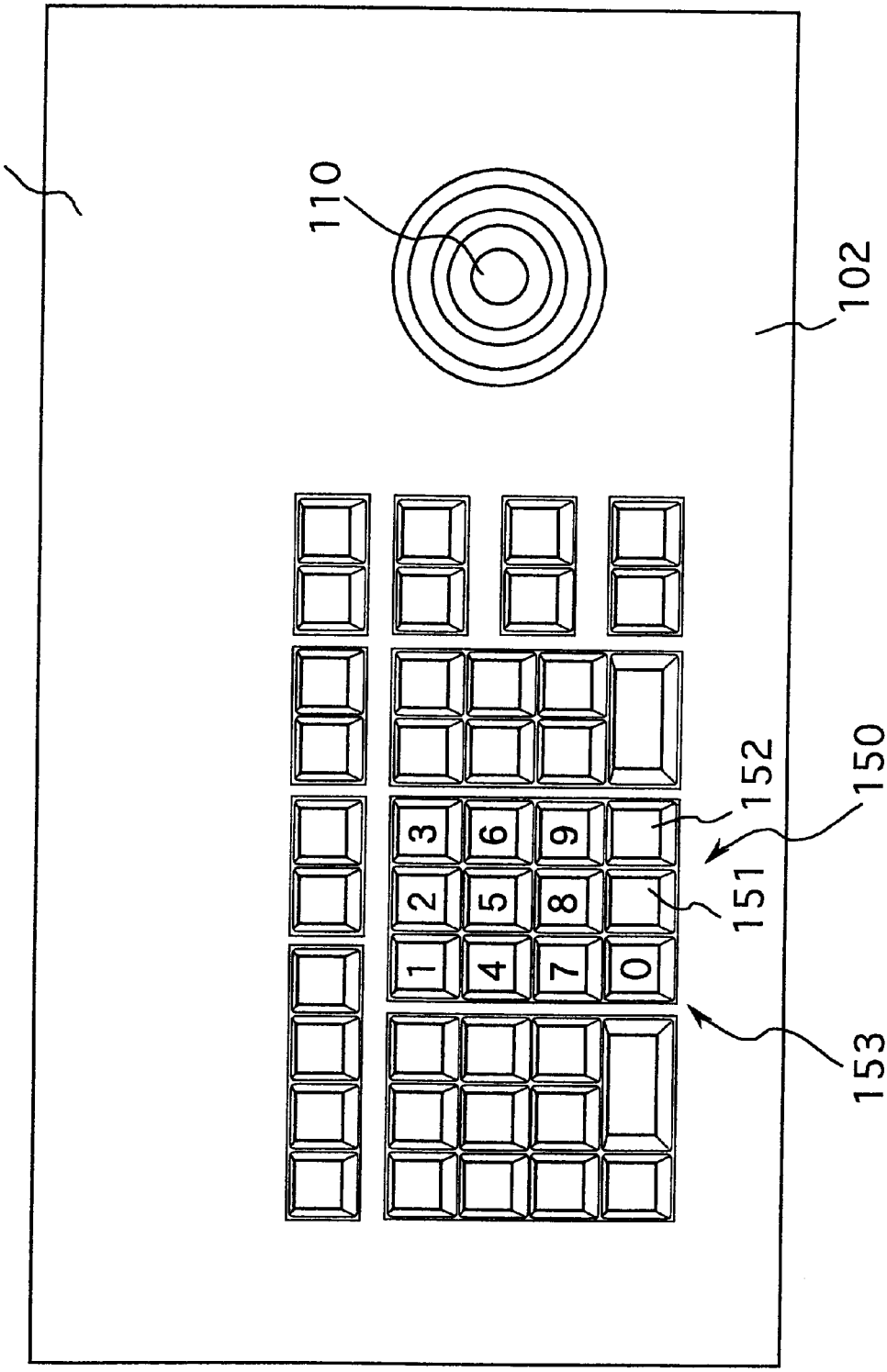
FIG. 1 is a plan view of one preferred embodiment of a camera operating apparatus according to the present invention.
Figure 2:
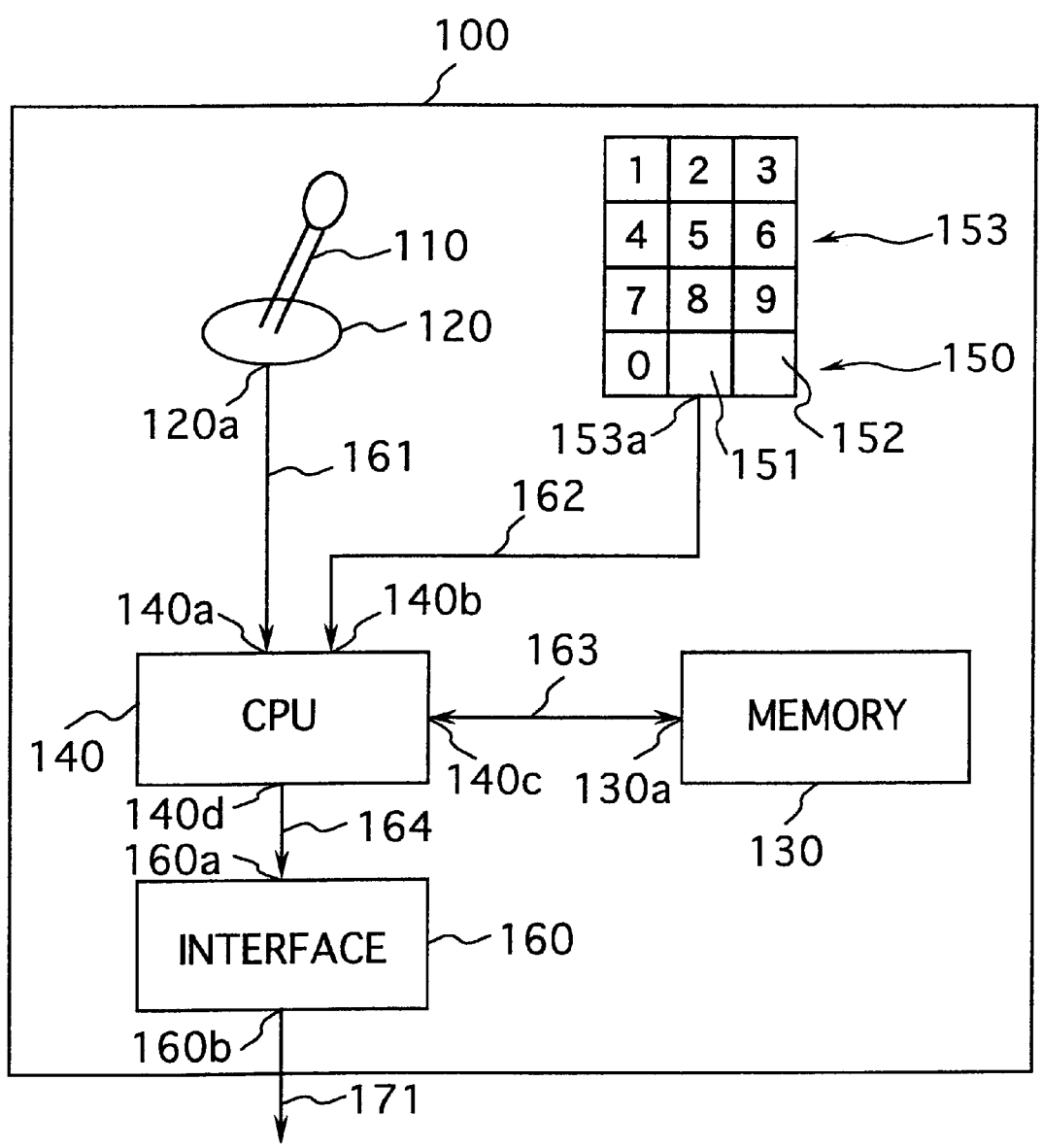
FIG. 2 is a block diagram showing a joystick, a plurality of keys, a central processing unit, a memory and an interface forming part of a camera operating apparatus according to the present invention.

One of the preferred embodiments of the camera operating apparatus according to the present invention will now be described in detail in accordance with the accompanying drawings.

Referring now to the drawings, in particular to FIGS. 1 to 6, there is shown one of the preferred embodiments of the camera operating apparatus according to the present invention. The camera operating apparatus 100 is assumed to operate at least one camera unit 180 at an operation speed and at an operation direction which are to be changed by an operator. The camera operating apparatus 100 comprises a retainer 101 having an operation surface 102, a joystick 110 mounted on the retainer 101 and having a center axis 111 and a center point 112 located on the center axis 111, and a central processing unit 140, hereinafter simply referred to as "CPU".

Figure 3:
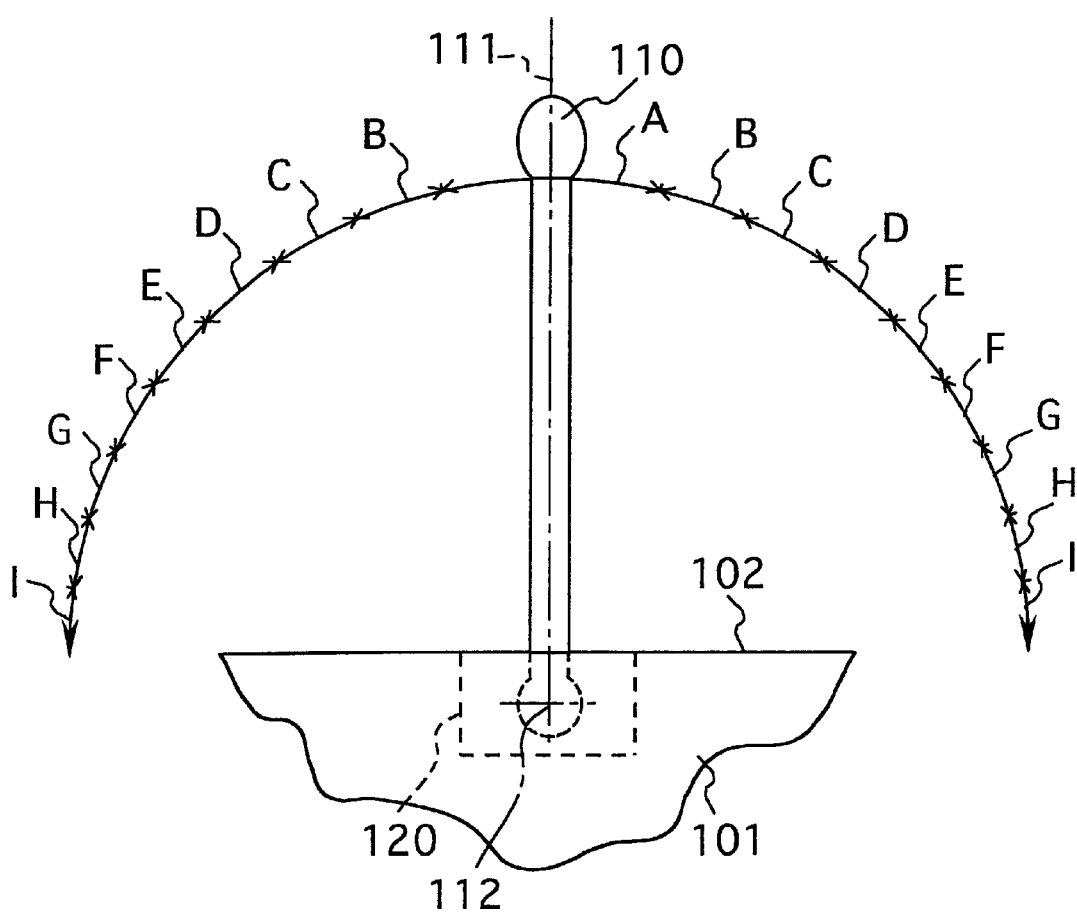
FIG. 3 is a fragmentary side view of a retainer and a joystick forming part of a camera operating apparatus shown in FIG. 1.

The joystick 110 is pivotable around the center point 112 of the joystick 110 to assume a first angular position where the joystick 110 is inclined with respect to the operation surface 102 of the retainer 101, and a second angular position where the joystick 110 is inclined with respect to the operation surface 102 of the retainer 101 at an inclination angle between the center axes 111 of the joystick 110 positioned at the first and second angular positions. The inclination angle of the joystick 110 is variably set with respect to the operation speed of the camera unit 180. In FIG. 3, the joystick 110 assumes the first angular position where the joystick 110 is inclined with respect to the operation surface 102 of the retainer 101 at a fixed angle of 90 degrees between the center axis 111 of the joystick 110 and the operation surface 102 of the retainer 101.

The camera operating apparatus 100 further comprises angle signal inputting means which is constituted by an angle detecting unit 120. The angle detecting unit 120 is designed to input an angle signal indicative of the inclination angle of the joystick 110 to the CPU 140. The inclination angle of the joystick 110 is divided in angle ranges "A" to "I" as shown in FIG. 3. The angle detecting unit 120 is operative to input the angle signal indicative of each of the angle ranges "A" to "I" to the CPU 140. The angle detecting unit 120 has a terminal 120a having the angle signal outputted therethrough.

The camera operating apparatus 100 further comprises a plurality of keys 153 each operatively arranged on the retainer 101 to perform a key-pushed action and a key-released action. Each of the keys 153 is operative to input a speed signal indicative of the key-pushed action thereof to the CPU 140. The keys 153 include a specified key 153 selected for the operation speed of the camera unit 180 desired by the operator. The keys 153 have a common terminal 153a having the respective speed signals outputted therethrough.

The keys 153 may include a plurality of numerical keys 153 which are selectively operated to input the respective speed signals to the CPU 140. The numerical keys 153 respectively bear numerals "0" to "9" as shown in FIG. 1. All the keys other than the numerical keys 153, however, respectively bear in reality their own letters or numerals that are not shown in FIG. 1.

The numerical keys 153 bearing the respective numerals "0" to "9" are assigned with respective desired speed signals indicative of the operation speeds of the camera unit 180 designated by the operator. For example, the operation speed "8" highest in speed is assigned to the numerical key 153 bearing the numeral "8", and the operation speed "1" lowest in speed is assigned to the numerical key 153 bearing the numeral "1". The numerical keys 153 have respective switches electrically connected to the common terminal 153a to ensure that the respective speed signals are outputted therethrough when the numerical keys 153 are selectively operated to perform the respective key-pushed actions.

The camera operating apparatus 100 further comprises information recording means which is constituted by a memory 130. The memory 130 is designed to record specific relevant information between the angle signal inputted from the angle detecting unit 120 and the speed signal inputted from the specified key 153 selected from among the numerical keys 153. The memory 130 is adapted to allow the CPU 140 to record the specific relevant information therein and to read out the specific relevant information into the CPU 140 therefrom. The memory 130 has a terminal 130a having the angle signal and the speed signal inputted and outputted therethrough.

The specific relevant information is formed by the relation between the angle ranges "A" to "I" and the operation speeds "0" to "8" as listed on the table shown in FIG. 4. Here, the operation speed "0" means the stop state of the camera unit 180, and the operation speed "1" means the lowest operation speed of the camera unit 180, and the operation speed "8" means the highest operation speed of the camera unit 180. The above fact leads to the fact that the operation speeds increase as the numerals "1" to "8" increase.

The camera operating apparatus 100 further comprises signal processing means constituted by the CPU 140 which is designed to receive and process the angle signal inputted from the angle detecting unit 120 and the speed signal inputted from the specified key 153 selected from among the numerical keys 153. The CPU 140 is operative to selectively assume two different operation states consisting of a first operation state under which the specific relevant information is recorded by the memory 130 in accordance with the angle signal inputted by the angle detecting unit 120 and the speed signal inputted by the specified key 153 selected from among the numerical keys 153, and a second operation state under which the speed signal in response to the angle signal inputted by the angle detecting unit 120 is outputted to the camera unit 180 in accordance with the specific relevant information recorded by the memory 130.

The CPU 140 has a first terminal 140a having the angle signal inputted therethrough, a second terminal 140b having the speed signal inputted therethrough, a third terminal 140c having the angle signal and the speed signal inputted and outputted therethrough, and a fourth terminal 140d having the speed signal outputted therethrough.

The camera operating apparatus 100 further comprises state setting means which is constituted by state setting keys 150. The state setting keys 150 are designed to selectively set the first and second operation states of the CPU 140. The state setting keys 150 include a first operation state holding key 151 for allowing the CPU 140 to assume the first operation state, and a second operation state holding key 152 for allowing the CPU 140 to assume the second operation state.

The first operation state holding key 151 is operatively arranged on the retainer 101 to perform a key-pushed action and a key-released action. The first operation state holding key 151 is operative to input a first operation state holding signal indicative of the key-pushed action thereof to the CPU 140. The above fact leads to the fact that the key-pushed action of the first operation state holding key 151 causes the CPU 140 to be operated to hold the first operation state. The first operation state holding key 151 has a common terminal 153a having the first operation state holding signal outputted therethrough.

The second operation state holding key 152 is operatively arranged on the retainer 101 to perform a key-pushed action and a key-released action. The second operation state holding key 152 is operative to input a second operation state holding signal indicative of the key-pushed action thereof to the CPU 140. The above fact leads to the fact that the key-pushed action of the second operation state holding key 152 causes the CPU 140 to be operated to hold the second operation state. The second operation state holding key 152 has a common terminal 153a having the second operation state holding signal outputted therethrough.

The camera operating apparatus 100 further comprises an interface 160 adapted to the CPU 140 to allow the speed signal in response to the angle signal from the angle detecting unit 120 to be outputted to the camera unit 180 in accordance with the specific relevant information recorded by the memory 130. The interface 160 has a first terminal 160a having the speed signal inputted therethrough and a second terminal 160b having the speed signal outputted therethrough.

The CPU 140 is electrically connected at the first terminal 140a and at the terminal 120a to the angle detecting unit 120 through a signal transmitting line 161. The CPU 140 is electrically connected at the second terminal 140b and at the common terminal 153a to the numerical keys 153 and the first and second operation state holding keys 151 and 152 through a signal transmitting line 162. The CPU 140 is electrically connected at the third terminal 140c and at the terminal 130a to the memory 130 through a signal transmitting line 163. The CPU 140 is electrically connected at the fourth terminal 140d and at the first terminal 160a to the interface 160 through a signal transmitting line 164. The interface 160 is electrically connected at the second terminal 160b to the camera unit 180 through a signal transmitting line 171.

Figure 5:
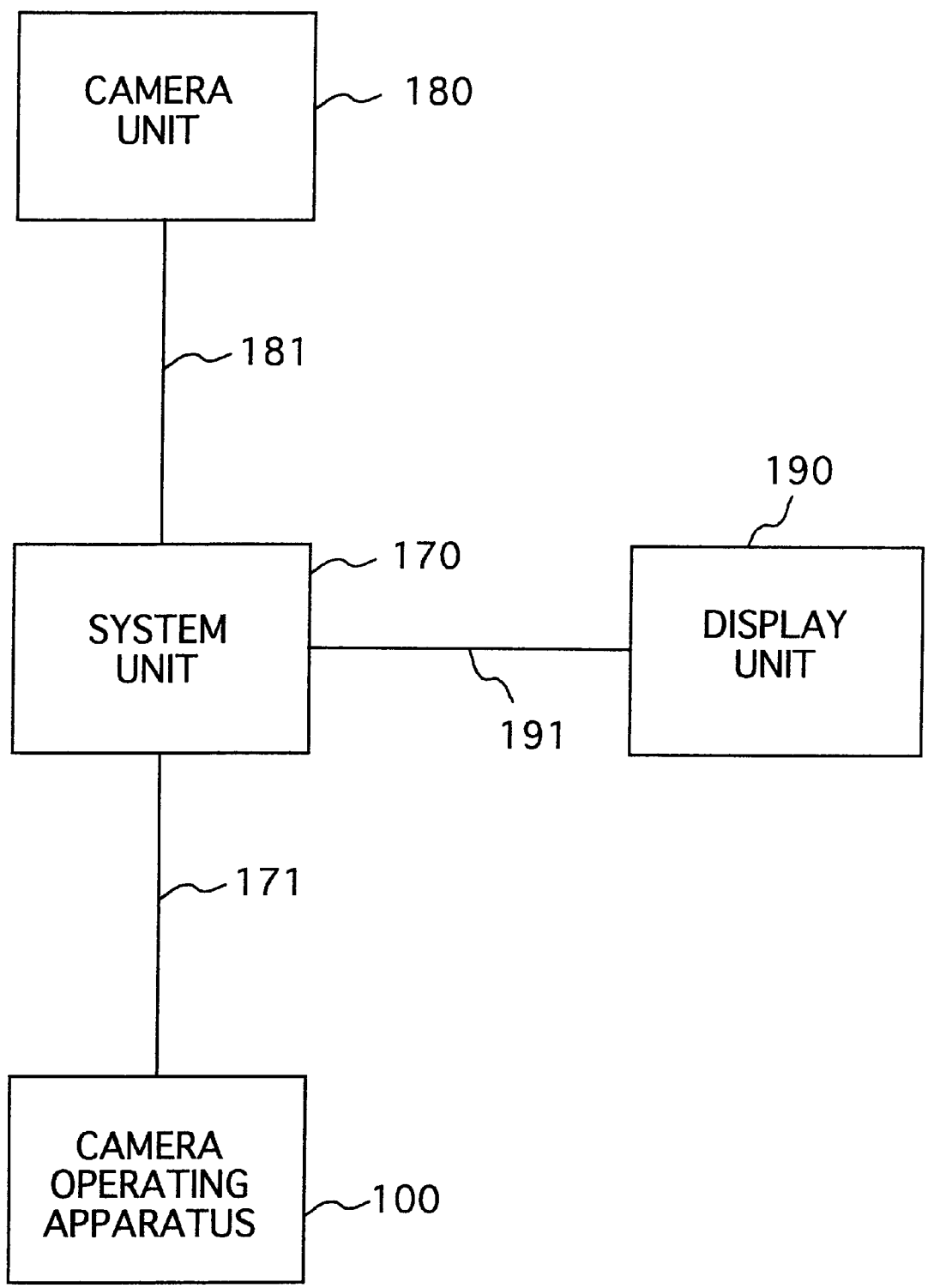
FIG. 5 is a block diagram showing a camera operating apparatus shown in FIG. 1 and a camera unit operatively connected with the camera operating apparatus.
Figure 7:
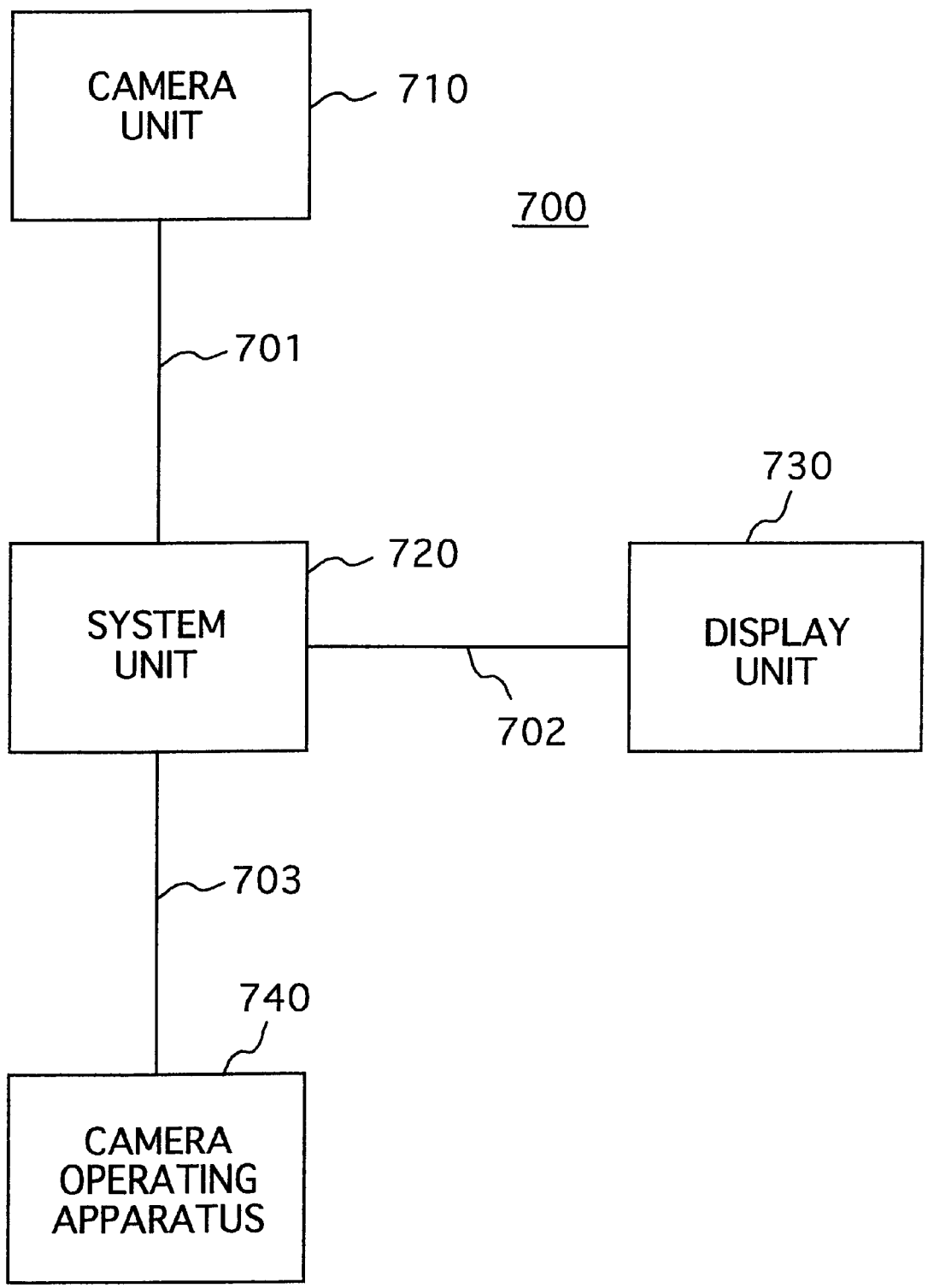
FIG. 7 is a block diagram of one example of a conventional surveillance system.

As shown in FIG. 5, the camera operating apparatuses 100 is provided in combination with a surveillance system which comprises a system unit 170, a camera unit 180, a display unit 190 and a camera operating apparatus 100 for operating the camera unit 180 at an operation speed and at an operation direction which are to be changed by an operator. The system unit 170 is electrically connected to the camera operating apparatus 100, the camera unit 180 and the display unit 190 through signal transmitting lines 171, 181 and 191, respectively.

The operation of the camera operating apparatus 100 will be described hereinafter with reference to the drawings shown in FIGS. 1 to 6.

The following description will be directed to the case that the joystick 110 is inclined with respect to the operation surface 102 of the retainer 101 while no first operation state holding key 151 is pushed by the operator. In this case, the CPU 140 is operated to assume the second operation state under which the speed signal in response to the angle signal inputted by the angle detecting unit 120 is outputted to the camera unit 180 in accordance with the specific relevant information recorded by the memory 130.

The CPU 140 is held in the second operation state to have the speed signal in response to the angle signal inputted by the angle detecting unit 120 outputted to the camera unit 180 in accordance with the specific relevant information recorded by the memory 130, and thus under the second operation state waiting for either the angle signal or the first operation state holding signal until any one of the angle signal and the first operation state holding signal is inputted to the CPU 140.

When the joystick 110 is inclined by the operator with respect to the operation surface 102 of the retainer 101 while no first operation state holding key 151 is pushed by the operator, the angle detecting unit 120 is operated to output the angle signal indicative of the inclination angle of the joystick 110 to the signal transmitting line 161. The angle signal thus outputted to the signal transmitting line 161 is then inputted to the CPU 140 through the signal transmitting line 161.

When the angle signal indicative of the inclination angle of the joystick 110 outputted to the signal transmitting line 161 is inputted to the CPU 140 through the signal transmitting line 161, the CPU 140 is operated to output the speed signal to the signal transmitting line 164 in accordance with the specific relevant information recorded by the memory 130. The speed signal thus outputted to the signal transmitting line 164 is then inputted to the interface 160 through the signal transmitting line 164.

When the speed signal thus outputted to the signal transmitting line 164 is inputted to the interface 160 through the signal transmitting line 164, the interface 160 is then operated to output the speed signal to the signal transmitting line 171. The speed signal thus outputted to the signal transmitting line 171 is inputted to the camera unit 180 by way of the signal transmitting line 171, the system unit 170 and the signal transmitting line 181 as shown in FIG. 5.

From the foregoing description, it will be understood that the joystick 110 inclined with respect to the operation surface 102 of the retainer 101 while no first operation state holding key 151 is pushed by the operator causes the camera unit 180 to be operated at the operation speed corresponding to the inclination angle of the joystick 120.

The following description will be directed to the case that the joystick 120 is inclined with respect to the operation surface 102 of the retainer 101 while the first operation state holding key 151 is pushed before the specified key 153 selected from among the numerical keys 153 is pushed by the operator. In this case, the CPU 140 is operated to assume the first operation state under which the specific relevant information is recorded by the memory 130 in accordance with the angle signal inputted by the angle detecting unit 120 and the speed signal inputted by the specified key 153 selected from among the numerical keys 153.

The CPU 140 is held in the second operation state to have the speed signal in response to the angle signal inputted by the angle detecting unit 120 outputted to the camera unit 180 in accordance with the specific relevant information recorded by the memory 130, and thus under the second operation state waiting for either the angle signal or the first operation state holding signal until any one of the angle signal and the first operation state holding signal is inputted to the CPU 140.

When the first operation state holding key 151 is pushed by the operator, the first operation state holding key 151 is operated to output the first operation state holding signal indicative of the key-pushed action thereof to the signal transmitting line 162. The first operation state holding signal thus outputted to the signal transmitting line 162 is then inputted to the CPU 140 through the signal transmitting line 162.

When the first operation state holding signal indicative of the key-pushed action of first operation state holding key 151 outputted to the signal transmitting line 162 is inputted to the CPU 140 through the signal transmitting line 162, the CPU 140 is operated to assume the first operation state under which the specific relevant information is recorded by the memory 130 in accordance with the angle signal inputted by the angle detecting unit 120 and the speed signal inputted by the specified key 153 selected from among the numerical keys 153.

When the joystick 110 is inclined by the operator with respect to the operation surface 102 of the retainer 101, the angle detecting unit 120 is operated to output the angle signal indicative of the inclination angle of the joystick 110 to the signal transmitting line 161. The angle signal thus outputted to the signal transmitting line 161 is then inputted to the CPU 140 through the signal transmitting line 161.

When the specified key 153 bearing the respective numerals "0" to "8" is pushed by the operator, the specified key 153 is operated to output the speed signal indicative of the key-pushed action thereof to the signal transmitting line 162. The speed signal thus outputted to the signal transmitting line 162 is then inputted to the CPU 140 through the signal transmitting line 162.

When the second operation state holding key 152 is pushed by the operator, the second operation state holding key 152 is operated to output the second operation state holding signal indicative of the key-pushed action thereof to the signal transmitting line 162. The second operation state holding signal thus outputted to the signal transmitting line 162 is then inputted to the CPU 140 through the signal transmitting line 162.

When the second operation state holding signal indicative of the key-pushed action of second operation state holding key 152 outputted to the signal transmitting line 162 is inputted to the CPU 140 through the signal transmitting line 162, the CPU 140 is operated to have the specific relevant information between the angle signal inputted by the angle detecting unit 120 and the speed signal inputted by the specified key 153 recorded by the memory 130.

With the specific relevant information thus recorded by the memory 130, the CPU 140 is operated to have the first operation state return to the second operation state. The CPU 140 is then held in the second operation state to have the speed signal in response to the angle signal inputted by the angle detecting unit 120 outputted to the camera unit 180 in accordance with the specific relevant information recorded by the memory 130.

From the foregoing description, it will be understood that the joystick 110 inclined with respect to the operation surface 102 of the retainer 101 while the first operation state holding key 151 is pushed before the specified key 153 selected from among the numerical keys 153 is pushed by the operator causes the CPU 140 to be operated to have the specific relevant information between the angle signal inputted by the angle detecting unit 120 and the speed signal inputted by the specified key 153 recorded by the memory 130.

It is to be understood form the above description that the camera operating apparatus 100 according to the present invention can facilitate to change the relation between the inclination angle of the joystick 110 and the operation speed of the camera unit 180 depending upon the needs by the operator to allow the operator to readily operate the joystick 110. For example, the relation between the inclination angle of the joystick 110 and the operation speed of the camera unit 180 can be changed from one relation listed on the table shown in FIG. 4 to another relation listed on the table shown in FIG. 6.

While it has been described in the foregoing embodiment that the state setting means 150 includes a first operation state holding key 151 for allowing the CPU 140 to assume the first operation state, and a second operation state holding key 152 for allowing the CPU 140 to assume the second operation state, the camera operating apparatus 100 according to the present invention may be constituted by any other means as long as the state setting means 150 can allow the CPU 140 to assume either the first operation state or the second operation state.

The previous camera operating apparatus 100 according to the present invention does not need such a second operation state holding key 152 forming part of the state setting means 150 if the angle signal and the speed signal are concurrently inputted to the CPU 140 to hold the CPU 140 in the first operation state under which the specific relevant information between the angle signal and the speed signal is recorded by the memory 130 in accordance with the angle signal and the speed signal concurrently inputted to the CPU 140 before the CPU 140 is held in the second operation state under which the speed signal in response to the angle signal is outputted in accordance with the specific relevant information recorded by the memory 130.

While it has been described in the foregoing embodiment that the plurality of keys 153 include a plurality of numerical keys 153 which are selectively operated to input the speed signal to the CPU 140, the camera operating apparatus 100 according to the present invention may be constituted by any other means as long as the keys 153 can be selectively operated to input the speed signal to the CPU 140.

Though the camera operating apparatus 100 is shown in FIG. 5 as being connected to the system unit 170 through the signal transmitting line 171, the camera operating apparatus 100 exemplified by the present invention may be separated from any other exterior appliance such a system unit 170 to allow the CPU 140 to be operated to assume the first operation state under which the specific relevant information is recorded by the memory 130 in accordance with the angle signal inputted by the angle detecting unit 120 and the speed signal inputted by the specified key 153.

While it has been described in the foregoing embodiment that the memory 130 and the CPU 140 are assembled in the retainer 101 to operate the camera unit 180 at the operation speed which is to be changed by the operator, the camera operating apparatus 100 according to the present invention may be constituted by any other means as long as the camera operating apparatus 100 can operate the camera unit 180 at the operation speed which is to be changed by the operator.

The previous camera operating apparatus 100 according to the present invention may have the memory 130 and the CPU 140 assembled in the system unit 170 to operate the camera unit 180 at the operation speed which is to be changed by the operator. This means that the memory 130 and the CPU 140 are assembled in the system unit 170 to be separated from the retainer 101.

While the present invention has thus been shown and described with reference to the specific embodiments, however, it should be noted that the invention is not limited to the details of the illustrated structures but changes and modifications may be made without departing from the scope of the appended claims.

What is claimed is:

1. A camera operating apparatus for operating at least one camera unit at an operation direction and at an operation speed which are to be changed by an operator, comprising:

a retainer having an operation surface;

a joystick mounted on said retainer to control said operation direction and said operation speed of said camera unit and having a center axis and a center point located on said center axis, said joystick being pivotable around said center point of said joystick to assume a first angular position where said joystick is inclined with respect to said operation surface of said retainer, and a second angular position where said joystick is inclined with respect to said operation surface of said retainer at an inclination angle between said center axes of said joystick positioned at said first and second angular positions, said inclination angle being variably set with respect to said operation speed;

angle signal inputting means for inputting an angle signal indicative of each of a group of inclination angle ranges in which said inclination angle of said joystick is divided, said group of inclination angle ranges including a minimum inclination angle range, a maximum inclination angle range, and an intermediate inclination angle range between said minimum and maximum inclination angle ranges;

a plurality of keys each operatively arranged on said retainer to perform a key-pushed action and a key-released action, each of said keys being operative to input a speed signal indicative of said key-pushed action thereof, said keys including a specified key selected for said operation speed of said camera unit desired by said operator with respect to each of said inclination angle ranges;

information recording means for recording specific relevant information between said angle signal inputted from said angle signal inputting means and said speed signal inputted from said specified key; and signal processing means for processing said speed signal in response to said angle signal from said angle signal inputting means to be outputted to said camera unit in accordance with said specific relevant information recorded by said information recording means.

2. A camera operating apparatus as set forth in claim 1, in which said information recording means is operative to record said specific relevant information when said signal processing means is operative to receive said angle signal from said angle signal inputting means and said speed signal from said specified key.

3. A camera operating apparatus as set forth in claim 1, in which said keys include a plurality of numerical keys which are selectively operated to input said speed signal to said signal processing means.

4. A camera operating apparatus for operating at least one camera unit at an operation direction and at an operation speed which are to be changed by an operator, comprising:

a retainer having an operation surface;

a joystick mounted on said retainer to control said operation direction and said operation speed of said camera unit and having a center axis and a center point located on said center axis, said joystick being pivotable around said center point of said joystick to assume a first angular position where said joystick is inclined with respect to said operation surface of said retainer, and a second angular position where said joystick is inclined with respect to said operation surface of said retainer at an inclination angle between said center axes of said joystick positioned at said first and second angular positions, said inclination angle being variably set with respect to said operation speed;

angle signal inputting means for inputting an angle signal indicative of each of a group of inclination angle ranges in which said inclination angle of said joystick is divided, said group of inclination angle ranges including a minimum inclination angle range, a maximum inclination angle range, and an intermediate inclination angle range between said minimum and maximum inclination angle ranges;

a plurality of keys each operatively arranged on said retainer to perform a key-pushed action and a key-released action, each of said keys being operative to input a speed signal indicative of said key-pushed action thereof, said keys including a specified key selected for said operation speed of said camera unit desired by said operator with respect to each of said inclination angle ranges;

information recording means for recording specific relevant information between said angle signal inputted from said angle signal inputting means and said speed signal inputted from said specified key; and signal processing means for receiving and processing said angle signal inputted from said angle signal inputting means and said speed signal inputted from said specified key, said signal processing means being operative to selectively assume two different operation states consisting of a first operation state under which said specific relevant information is recorded by said information recording means in accordance with said angle signal inputted by said angle signal inputting means and said speed signal inputted by said specified key, and a second operation state under which said speed signal in response to said angle signal inputted by said angle signal inputting means is outputted to said camera unit in accordance with said specific relevant information recorded by said information recording means.

5. A camera operating apparatus as set forth in claim 4, which further comprises state setting means for selectively setting said first and second operation states of said signal processing means.

6. A camera operating apparatus as set forth in claim 5, in which said state setting means includes a first operation state holding key operatively arranged on said retainer to perform a key-pushed action and a key-released action, said first operation state holding key being operative to input a first operation state holding signal indicative of said key-pushed action thereof to said signal processing means to allow said signal processing means to assume said first operation state.

7. A camera operating apparatus as set forth in claim 5, in which said state setting means includes a second operation state holding key operatively arranged on said retainer to perform a key-pushed action and a key-released action, said second operation state holding key being operative to input a second operation state holding signal indicative of said key-pushed action thereof to said signal processing means to allow said signal processing means to assume said second operation state.

8. A camera operating apparatus as set forth in claim 4, in which said keys include a plurality of numerical keys which are selectively operated to input said speed signal to said signal processing means.

9. A camera operating apparatus for operating at least one camera unit at an operation direction and at an operation speed which are to be changed by an operator, comprising:

a retainer having an operation surface;

a joystick mounted on said retainer to control said operation direction and said operation speed of said camera unit and having a center axis and a center point located on said center axis, said joystick being pivotable around said center point of said joystick to assume a first angular position where said joystick is inclined with respect to said operation surface of said retainer, and a second angular position where said joystick is inclined with respect to said operation surface of said retainer at an inclination angle between said center axes of said joystick positioned at said first and second angular positions, said inclination angle being variably set with respect to said operation speed;

angle signal inputting means for inputting an angle signal indicative of each of a group of inclination angle ranges in which said inclination angle of said joystick is divided, said group of inclination angle ranges including a minimum inclination angle range, a maximum inclination angle range, and an intermediate inclination angle range between said minimum and maximum inclination angle ranges, said angle signal inputting means having a terminal having said angle signal outputted therethrough;

a plurality of keys each operatively arranged on said retainer to perform a key-pushed action and a key-released action, each of said keys being operative to input a speed signal indicative of said key-pushed action thereof, said keys including a specified key selected for said operation speed of said camera unit desired by said operator with respect to each of said inclination angle ranges, said keys having a terminal having said respective speed signals outputted therethrough;

information recording means for recording specific relevant information between said angle signal inputted from said angle signal inputting means and said speed signal inputted from said specified key, said information recording means having a terminal having said angle signal and said speed signal inputted and outputted therethrough; and signal processing means for receiving and processing said angle signal inputted from said angle signal inputting means and said speed signal inputted from said specified key, said signal processing means being operative to selectively assume two different operation states consisting of a first operation state under which said specific relevant information is recorded by said information recording means in accordance with said angle signal inputted by said angle signal inputting means and said speed signal inputted by said specified key, and a second operation state under which said speed signal in response to said angle signal inputted by said angle signal inputting means is outputted to said camera unit in accordance with said specific relevant information recorded by said information recording means, said signal processing means having a first terminal having said angle signal inputted therethrough, a second terminal having said speed signal inputted therethrough, a third terminal having said angle signal and said speed signal inputted and outputted therethrough and a fourth terminal having said speed signal outputted therethrough.

10. A camera operating apparatus as set forth in claim 9, which further comprises state setting means for selectively setting said first and second operation states of said signal processing means.

11. A camera operating apparatus as set forth in claim 10, in which said state setting means includes a first operation state holding key operatively arranged on said retainer to perform a key-pushed action and a key-released action, said first operation state holding key being operative to input a first operation state holding signal indicative of said key-pushed action thereof to said signal processing means to allow said signal processing means to assume said first operation state, said first operation state holding key having a terminal having said first operation state holding signal outputted therethrough.

12. A camera operating apparatus as set forth in claim 10, in which said state setting means includes a second operation state holding key operatively arranged on said retainer to perform a key-pushed action and a key-released action, said second operation state holding key being operative to input a second operation state holding signal indicative of said key-pushed action thereof to said signal processing means to allow said signal processing means to assume said second operation state, said second operation state holding key having a terminal having said second operation state holding signal outputted therethrough.

13. A camera operating apparatus as set forth in claim 9, in which said keys include a plurality of numerical keys which are selectively operated to input said speed signal to said signal processing means.

* * * * *